Oct. 20, 1959 G. H. NICHOLS 2,909,290
TRACTOR MOUNTED SIDE BOOM CRANE
Filed Aug. 14, 1956 3 Sheets-Sheet 1
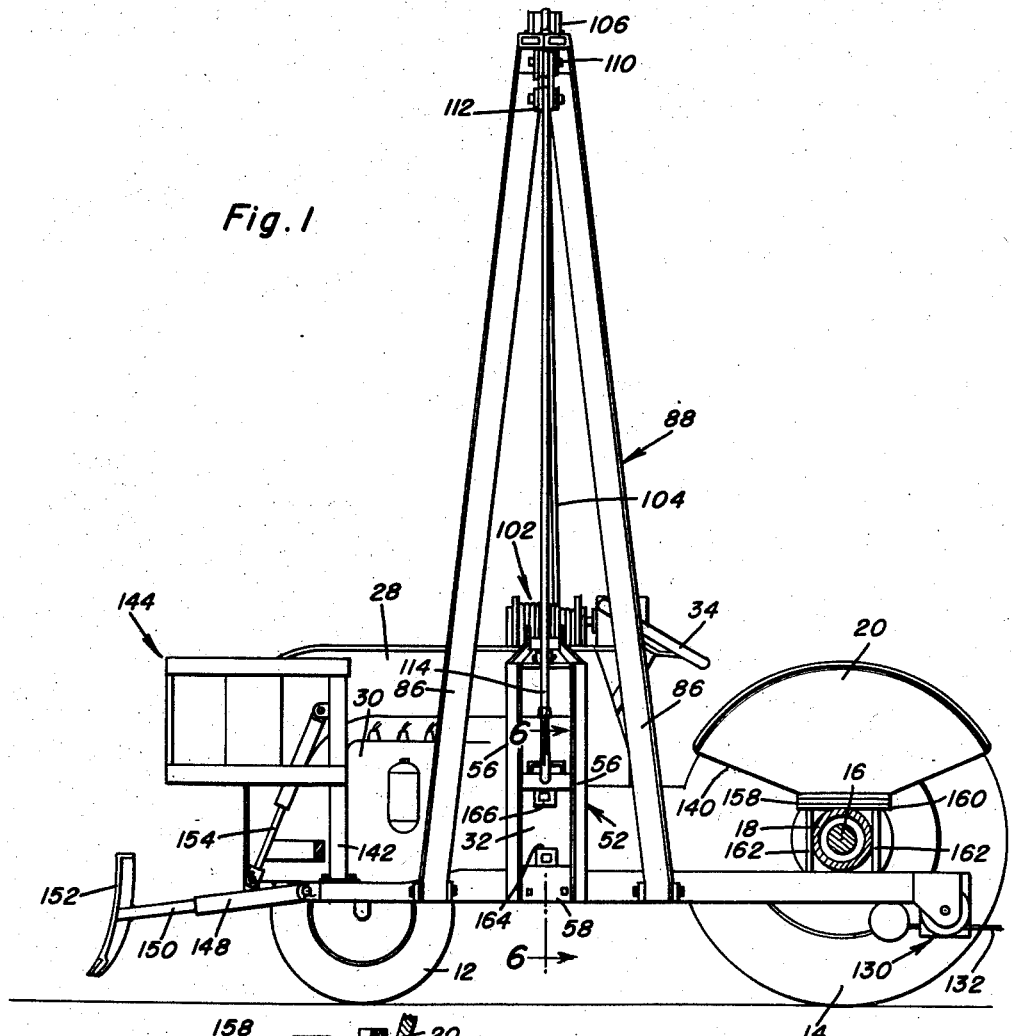
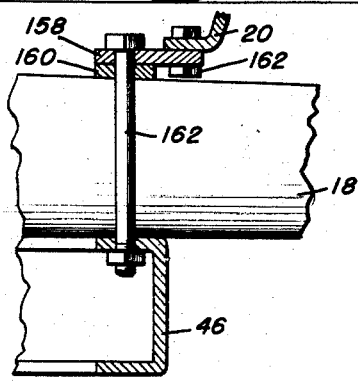
Fig. 1
Fig. 5
Gerald H. Nichols
INVENTOR.

Oct. 20, 1959   G. H. NICHOLS   2,909,290
TRACTOR MOUNTED SIDE BOOM CRANE
Filed Aug. 14, 1956   3 Sheets-Sheet 2

Gerald H. Nichols
INVENTOR.

Oct. 20, 1959  G. H. NICHOLS  2,909,290
TRACTOR MOUNTED SIDE BOOM CRANE
Filed Aug. 14, 1956  3 Sheets-Sheet 3

Gerald H. Nichols
INVENTOR.

BY

United States Patent Office 2,909,290
Patented Oct. 20, 1959

2,909,290

TRACTOR MOUNTED SIDE BOOM CRANE

Gerald H. Nichols, Bethany, Okla., assignor, by mesne assignments, to G & H Constructors, Inc., a corporation Application August 14, 1956, Serial No. 604,023

3 Claims. (Cl. 212—8)

This invention relates in general to new and useful improvements in material handling devices, and more specifically to a crane of the side boom type which is mounted on a tractor.

At the present time there exists numerous types of side boom cranes which are mounted on tractors. However, the construction of the cranes are such that they require tractors of the endless tread track type and as a result, they are relatively expensive. Also, said intermediate frame assembly extending transversely of said frame in alignment with said boom mounting means, they are heavy and in many instances actually unsuitable for many light jobs.

It is therefore the primary object of this invention to provide a side mounted boom assembly which is of such a nature whereby it may be readily mounted upon a farm tractor of the wheeled type so that the farm tractor may be converted into a tractor mounted side boom crane.

Another object of this invention is to provide an improved frame for mounting a side mounted boom on a farm tractor, the frame being so constructed whereby it may be attached to a farm tractor at points adjacent the wheels thereof so that a load from a boom carried by the frame will be directed to the frame or running parts of the tractor directly to the wheels without putting stresses on the critical parts of the tractor.

Another object of this invention is to provide an improved side mounted boom assembly, the side mounted boom assembly including a frame which may be easily attached to a farm type tractor of the wheel supported type and which is provided with a simple boom structure and drive means for the boom, the boom drive means being of the hydraulic type and being driven by the hydraulic system of the farm tractor or by a separate system, as desired.

A further object of this invention is to provide an improved frame for mounting a side mounted boom on a farm tractor, the frame including longitudinal frame rails connected at the forward and rear ends thereof by a front frame transverse member and rear transverse frame member, respectively, and there being an intermediate frame assembly, the frame being so constructed whereby it may be attached to a front mounting plate of the tractor and to the rear axle housing so that the frame may be so mounted on the tractor so that stress placed upon the tractor will be transmitted directly to the wheels of the tractor without placing any undue stresses upon the working mechanism of the tractor.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a side elevational view of a conventional type of farm tractor and shows mounted thereon the side mounted boom assembly which is the subject of this invention, the wheels on one side of the tractor being omitted for purposes of clarity;

Figure 3:
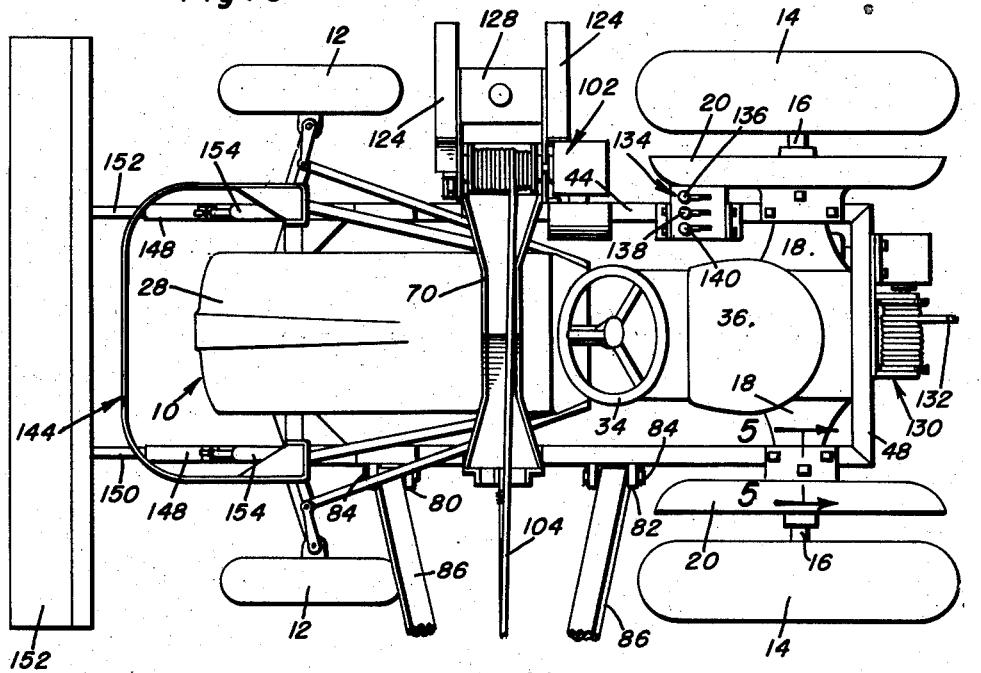
Figure 3 is a top plan view of the tractor mounted side boom crane with a portion of the boom being broken away.
Figure 6:
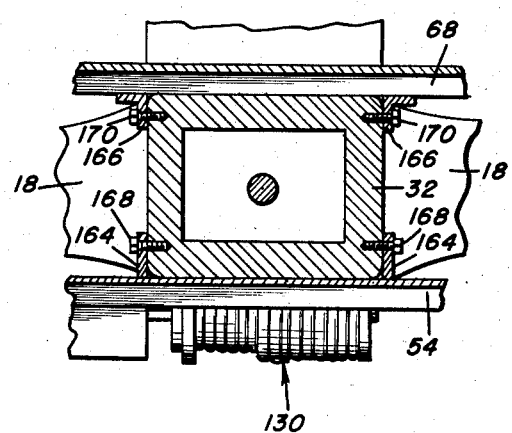

Figure 5 is an enlarged fragmentary sectional view taken substantially upon the plane indicated by the section line 5—5 of Figure 3 and shows the manner in which the frame is secured to the rear axle housing of the tractor; and Figure 6 is an enlarged fragmentary sectional view taken substantially upon the plane indicated by the section line 6—6 of Figure 1 and shows the manner in which the frame is stabilized relative to the tractor intermediate the ends thereof.

Referring now to the drawings in detail, it will be seen that there is illustrated a conventional type of farm tractor which is referred to in general by the reference numeral 10. Inasmuch as the farm tractor 10 may vary, only those portions of the farm tractor which are essential to the present invention will be set forth in detail hereinafter.

The farm tractor 10 includes a pair of front wheels 12 and a pair of rear wheels 14. The rear wheels 14 are supported by axles 16 mounted in rear axle housings 18. Carried by the rear axle housings 18 are suitable guards or fenders 20.

Disposed at the extreme front end of the tractor 10 is a front mounting plate 24. Extending above the front mounting plate 24 is a grill 26 which terminates in a horizontal housing 28 which may support a gas tank. The housing 28 overlies an engine 30 which has connected thereto a transmission 32. The tractor 10 also includes a steering wheel 34 and a seat 36.

Mounted on the tractor 10 is a side mounted boom assembly which is referred to in general by the reference numeral 40. The side mounted boom assembly 40 includes a supporting frame which is referred to in general by the referenec numeral 42.

Figure 4:
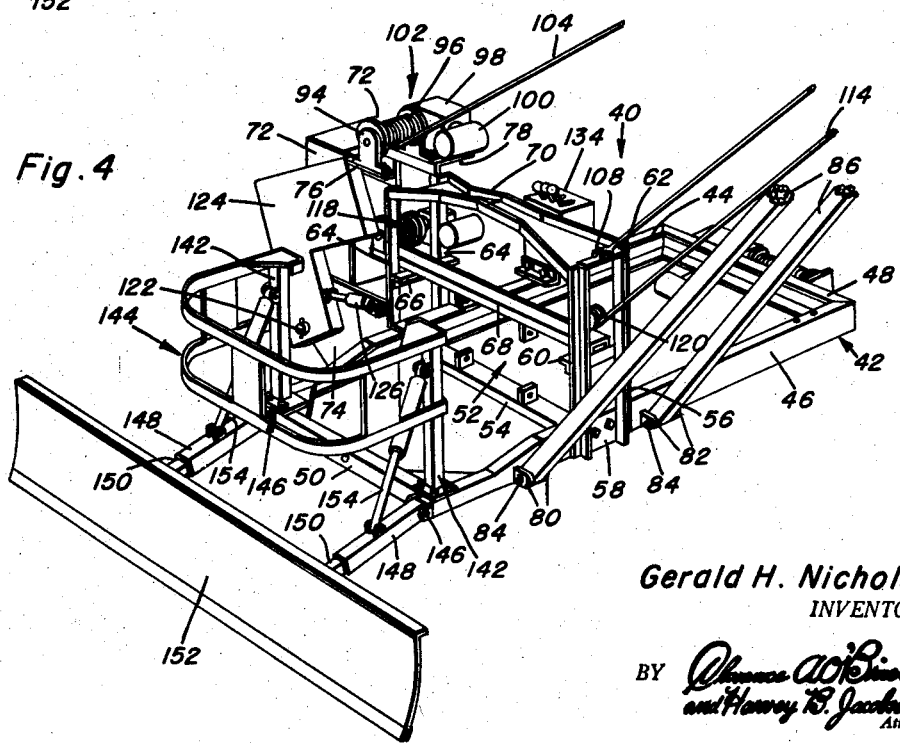
Figure 4 is a perspective view of the side mounted boom assembly and shows the specific details of the construction of the frame thereof, portions of the boom and certain of the cable for operating the boom being broken away.
Figure 2:
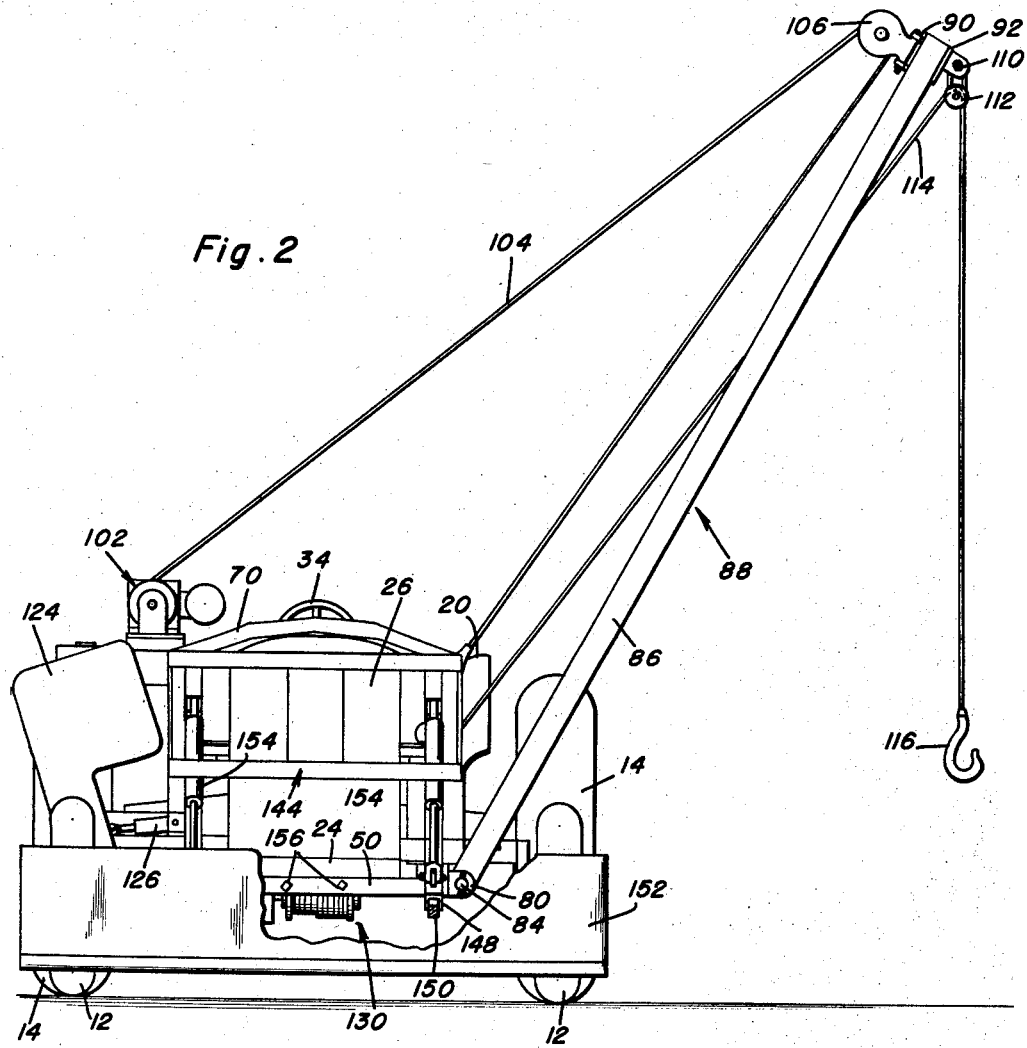
Figure 2 is a front elevational view of the farm tractor and the side mounted boom assembly and shows the general position of the boom and the means for controlling the operation thereof, a scraper blade on the front of the tractor having a portion thereof broken away in order to show the general details of the mounting of the boom.

As is best illustrated in Figure 4, the frame 42 includes a pair of longitudinally extending frame rails 44 and 46 which are connected together at their rear ends by rear transverse frame member 48. The forward ends of the frame rails 44 and 46 are connected together by a front transverse frame rail 50. The frame rails 44 and 46 are connected together intermediate their ends by an intermediate transverse frame assembly 52.

The intermediate transverse frame assembly 52 includes a lower frame member 54 which is connected to the frame rails 44 and 46. Extending upwardly from the frame rail 46 in alignment with the frame member 54 is a pair of longitudinally spaced frame members 56. The lower ends of the frame members 56 are connected together by a plate 58 which is in turn secured to the frame rail 46. The frame members 56 are connected together intermediate their ends by a member 60 and at their upper ends by a member 62.

Extending upwardly from the frame rail 44 in alignment with the frame member 54 is a pair of members 64. The members 64 have their lower ends connected together by a plate (not shown) similar to plate 58 which is secured to the frame rail 44. The members 64 are connected together intermediate their ends by a member 66 which is aligned with the member 60.

Extending between the members 60 and 66 and secured thereto is an upper frame member 68 which overlies the lower frame member 54. The upper ends of the members 56 and 64 are also connected together by an upper brace 70 which extends transversely of the frame 42.

In order to facilitate the mounting of other elements there is disposed in parallel relation to the members 64, but positioned outwardly thereof vertically disposed plates 72. The plates 72 have their lower portions connected to the members 64 and to the frame rail 44 by means of plates 74. The upper portions of the plates 74 are connected to the members 64 by transverse members 76 and 78, the member 78 being relatively wide for a purpose to be described in more detail hereinafter.

Extending outwardly from the frame rail 46 is a first pair of ears 80, the individual ears being longitudinally spaced. Also extending outwardly from the frame rail 46 is a second pair of ears 82, the individual ears being longitudinally spaced. The ears 80 and 82 are disposed forwardly and rearwardly, respectively, of the members 56. Carried by the ears 80 and 82 are aligned pivot pins 84 on which there are pivotally mounted lower ends of legs 86 of a boom 88. The upper ends of the legs 86 are connected together by suitable transverse plates 90 and 92.

Carried by the frame member 76 is a suitable bearing type support 94 which facilitates in the supporting of drum 96. The drum 96 is also supported by a gear box 98 which is in turn driven by hydraulic motor 100. The gear box 98 is mounted on the frame member 78. It is to be understood that the drum 96, and the gear box 98 and the hydraulic motor 100 constitute a winch which is referred to in general by the reference numeral 102, the winch 102 being typical of the winches to be used in conjunction with the present invention.

Suitably wound upon the drum 96 is a cable 104 which passes up and over a shim 106 pivotally mounted on the plate 90. The cable 104 extends downwardly from the shim 106 and is dead-ended as at 108 on the member 62. By operating the winch 102, the boom 88 may be swung inwardly or outwardly with respect to the frame 42 as desired.

Secured to the plate 92 is a bracket 110 which pivotally supports a second shim 122. Extending over the shim 112 is a cable 114 which is provided at one end with a suitable hook 116. The opposite end of the cable 114 is attached to a winch 118 which is secured to an extension of the upper frame member 68, as is best illustrated in Figure 4. The cable 114 extends horizontally from the winch 118 and is guided by a suitable shim 120 beside the frame 42 opposite from the winch 118.

In order to counterbalance the weight of the boom 88 and any article which may be lifted utilizing the boom 88, there is pivotally secured to the plate 74 by means of pivot pins 122, a pair of counterweights 124. In order that the counterweights 124 may be extended or retracted as is necessary to counterbalance the boom 88, there is connected to the counterweights 124 extensible retainers 126 of the double-acting hydraulic motor type. The retainers 126 are anchored on the plate 74 and will be connected to the hydraulic system of a tractor, such as the tractor 10. A simple control will be provided for extending or retracting the retainers 126 as is deemed necessary by the operator of the train.

If desired, a hydraulic oil reservoir such as the tank 128 may be mounted between the plates 72 so as to normally counterbalance the weight of the boom 88 per se. In order that the crane formed from the tractor 10 and the side mounted boom assembly 40 may be used for hauling or towing, there is mounted on the rear transverse frame member 48 a rear winch which is referred to in general by the reference numeral 130. The winch 130 is provided with a cable 132.

It is to be understood that the winches 102, 118 and 130 are to have their hydraulic motors connected to either a suitable hydraulic system mounted on the front of the tractor 10 or the hydraulic system of the tractor 10. Suitable hydraulic lines will be provided for this purpose and the hydraulic lines will run to a master control valve assembly which is referred to in general by the reference numeral 134 and which includes a plurality of four-way valves. The control valve assembly 134 will be mounted on the frame rail 44 adjacent the operator's seat 36 and will be provided with suitable control handles 136, 138 and 140 for controlling the operation of the winches 130, 118 and 102, respectively.

Extending upwardly from the forward ends of the frame rails 44 and 46 are uprights 142. The uprights 142 have secured to the upper portions thereof a front guard assembly 144 which extends forwardly of the grill 26 of the tractor 10 and serves to protect it against damage.

Pivotally connected to the forward ends of the frame rails 44 and 46 by means of brackets 146 are tubular support arms 148. The support arms 148 have slidably mounted therein extension arms 150 which are in turn secured to a grader blade 152. By extending or retracting the auxiliary extension arms 150, the grader blade 152 may be angled transversely of the frame 42 as desired.

Extending between the uprights 142 and the arms 148 are extensible braces 154. The braces 154 are preferably of the double-acting hydraulic motor type so that they may be remotely controlled. By shortening or lengthening the braces 154, the blade 152 may be raised or lowered as desired.

Upon reviewing the structure illustrated in Figure 4, it will be seen that there is illustrated a complete side mounted boom assembly which may be conveniently mounted on farm tractors of various types. Of course, the particular frame 42 is designed for a particular farm tractor, such as the farm tractor 10. With minor modifications the frame 42 may be mounted on other farm tractors so that the various components of the side mounted boom assembly may function in any desired manner.

When the frame 42 is mounted on the tractor 10, the front transverse frame member 50 is in abutment with the front attaching plate 24 of the tractor 10 and is secured thereto by suitable fasteners 156. The frame rails 44 and 46 underlie the rear axle housing 18, as is best illustrated in Figure 5. Overlying the rear axle housing 18 are mounting plates 158 which have secured to the undersides thereof suitable seats 160 for seating on the rear axle housing 18. Extending between the mounting plates 158 and the frame rails 46 forwardly and rearwardly of the rear axle housings 18 are suitable bolts 162. Thus, the mounting plates 158 and the frame rails 44 and 46 are clamped on the rear axle housings 18. The fenders or guards 20 are secured to and supported by the mounting plates 158 through the use of bolts 162.

Inasmuch as the frame 42 is attached directly to the frame of the tractor 10 in the vicinity of the front axle, the load imposed upon the tractor 10 at the front thereof will be directed directly to the front wheels 12. Also, inasmuch as the frame rails 44 and 46 are connected directly to the rear axle housings 18, none of the load on the rear part of the frame 42 will be directed to any critical part of the tractor 10, but will be directed directly to the rear wheels 14.

In order to stabilize the frame 42 intermediate the ends thereof, there is secured to the lower frame member 54 a pair of upstanding ears 164, the ear 164 being transversely spaced. Also, there is secured to the underside of the upper frame member 68 a pair of depending ears 166. The depending ears 166 are also transversely spaced and are aligned with the ears 164. The ears 164 and 166 are disposed on opposite sides of the transmission housing and are secured thereto by suitable bolts 168 and 170, respectively. It is to be noted that the lower frame member 54 directly underlies the housing of the transmission 32 and that the upper frame member 68 directly overlies the housing transmission 32. The connection between the frame 42 and the transmission 32 is primarily intended to prevent twisting of the frame 42 and is not intended to place any direct load upon the transmission 32 from the boom 88 or objects carried thereby.

From the foregoing description of the side mounted boom assembly 40, it will be readily apparent that there has been devised a relatively simple construction, including a highly desirable frame 42 which may be conveniently mounted upon low cost, light weight existing farm tractors, such as the tractor 10. Such a tractor is highly maneuverable and is not subject to break down of expensive parts such as in the case of more expensive tractors of the endless track type.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A side mounted boom assembly for a tractor of the wheel supported type, said boom assembly comprising a frame, said frame including a pair of spaced frame rails, front and rear transverse frame members, means for attaching said front transverse frame member to a tractor front mounting plate, means on said frame rails for attachment to a tractor rear axle housing, an intermediate frame assembly carried by said frame rails, said intermediate frame assembly including upper and lower transverse frame members adapted to be disposed above and below a transmission housing, means on said upper and lower transverse frame members for attachment to a tractor transmission housing to stabilize said frame, a boom, boom mounting means on one of said frame rails pivotally mounting said boom on said frame with said boom extending outwardly to one side of said frame, and winch means carried by said intermediate frame assembly, said winch means being connected to said boom for operating said boom.

2. The side mounted boom assembly of claim 1 wherein said winch means is of the hydraulic driven type and said tractor includes a hydraulic system, said winch means being connected to said tractor hydraulic system.

3. The side mounted boom assembly of claim 1 together with the addition of an adjustable counterweight pivotally carried by said intermediate frame assembly for counterbalancing said boom, said counterweight being disposed remote from said boom.

References Cited in the file of this patent

UNITED STATES PATENTS

| | | |
|---|---|---|
| 2,003,599 | Le Tourneau | June 4, 1935 |
| 2,077,741 | Cardwell | Apr. 20, 1937 |
| 2,468,602 | Lord | Apr. 26, 1949 |
| 2,722,320 | Dobeus et al. | Nov. 1, 1955 |
| 2,738,083 | Cadwell | Mar. 13, 1956 |
| 2,763,385 | Harrison | Sept. 18, 1956 |